S. B. SICKELSMITH.
TROLLEY.
APPLICATION FILED APR. 7, 1908.
912,427.
Patented Feb. 16, 1909.
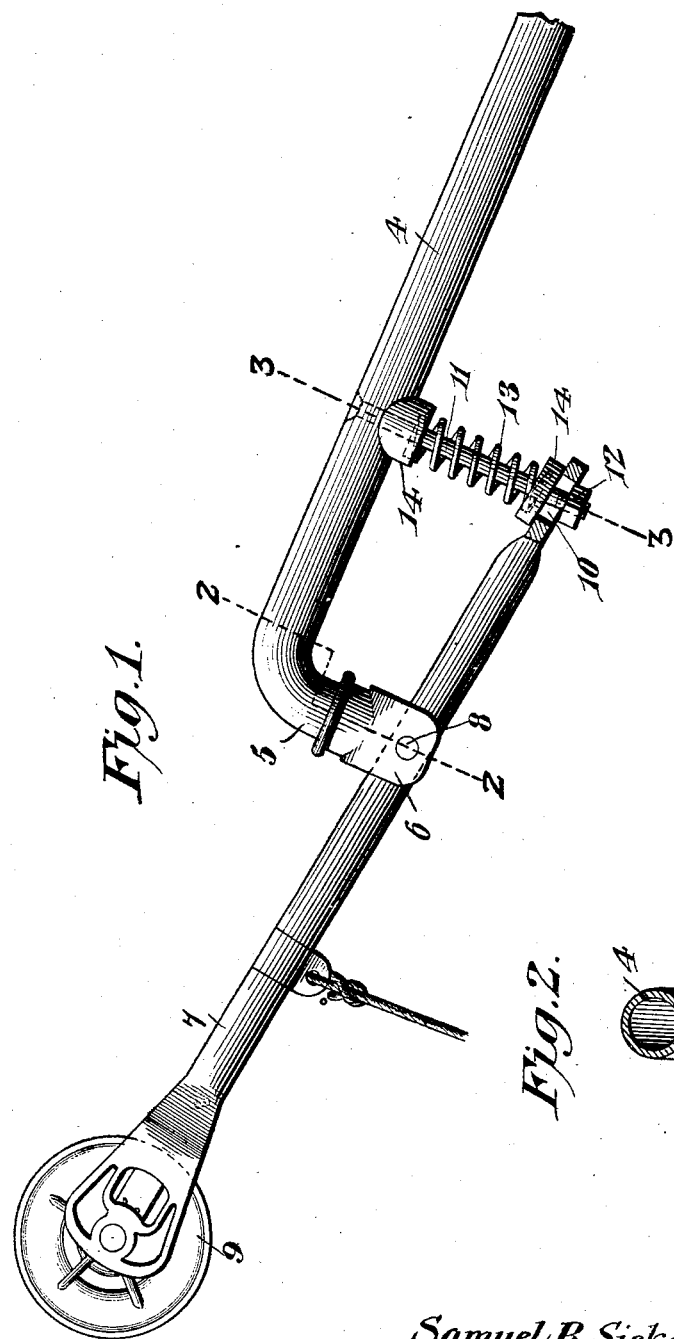
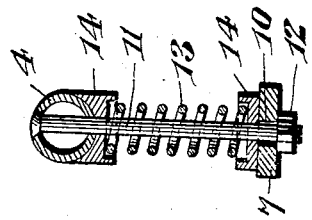
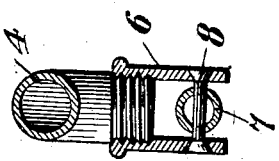
Witnesses
Jas. F. McCathran
Samuel B. Sickelsmith, Inventor
By E. G. Siggers
Attorney

UNITED STATES PATENT OFFICE.

SAMUEL B. SICKELSMITH, OF NEWHAVEN, PENNSYLVANIA.

TROLLEY.

No. 912,427.     Specification of Letters Patent.     Patented Feb. 16, 1909.

Application filed April 7, 1908. Serial No. 425,721.

*To all whom it may concern:*

Be it known that I, SAMUEL B. SICKELSMITH, a citizen of the United States, residing at Newhaven, in the county of Fayette and State of Pennsylvania, have invented a new and useful Trolley, of which the following is a specification.

This invention relates to trolley poles, and the primary object is to provide a novel structure in which the wheel is more completely relieved of the rock and play of the car, and can more quickly adapt itself to the changes or inequalities of the wire against which it travels, than is the case with trolley wheels journaled directly on the ends of long poles as is now customary, thereby reducing materially the liability of the wheel becoming highly heated and its jumping or disengaging the wire.

A further object is to so arrange the structure that in case the wheel is off the wire, the pole will readily pass span wires or other overhead obstructions of a similar character.

The preferred form of construction is illustrated in the accompanying drawings, wherein:—

Figure 1 is a side elevation of the upper portion of a trolley pole and head. Figs. 2 and 3 are respectively cross sectional views on the line 2—2 and 3—3 of Fig. 1.

Similar reference numerals designate corresponding parts in all the figures of the drawings.

In the embodiment disclosed, the upper portion of a trolley pole is shown, and is designated by the reference numeral 4, this pole being mounted on a car in any well known or suitable manner. The upper end of the said pole is downwardly or rearwardly turned, as shown at 5, and screwed or otherwise fastened to said end, is a yoke 6. An arm 7, disposed longitudinally of the pole 4, has an intermediate portion located in the yoke, and is pivoted thereto by a transverse pin 8. It will be noted by reference to Fig. 2 that the diameter of the arm is less than the space between the sides of the yoke so that the said arm is capable of a lateral sliding movement on the pivot pin 8. On the outer end of the arm 7 is journaled a trolley wheel 9 of any suitable structure, and the inner end of said arm is provided with an opening or slot 10. A guide stem 11, fixed to the pole 4 and extending rearwardly therefrom, passes through the slot or opening 10, and has on its free end, a nut or other stop 12 against which the inner end of the arm normally abuts. A compression spring 13 is interposed between the inner end of the arm 7 and the pole, being mounted on the stem 11 and held centered with respect thereto by suitable washers 14. With this structure therefore, it will be evident that the trolley wheel 9 being mounted on the swinging arm 7, is capable of play with respect to the pole 4, and the arm 7 being comparatively short, there is not the same amount of inertia to overcome as if the wheel were mounted directly on the end of a long pole. Further than this, the structure is so arranged that if the wheel should become disengaged from the wire against which it travels, cross wires which may be in the way, will ride freely up the pole 4 and arm 7, the wheel 9 passing beneath the same, there being no projecting portions against which such cross wires can hang or catch. With this construction moreover, it will be noted that while the pin 8 constitutes a pivot on which the arm 7 swings and the stem 11 constitutes a guide during such swinging movement, said stem also constitutes a pivot on which the arm 7 can swing laterally of the pole 4 in which case, the pin 8 constitutes a guide. This slight lateral movement is of advantage, particularly on lines having short or sharp curves.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. In a structure of the character set forth, the combination with a trolley pole having a downwardly offset upper end, of an arm disposed longitudinally and in rear of said pole, a pivotal connection between the downwardly offset upper end of the pole and an intermediate portion of the arm, a trolley wheel journaled on the upper end of the arm and located above said offset end, a guide stem carried by the pole below the offset end and being slidably engaged by the lower end of the arm, and a compression spring located on the stem and interposed between the pole and arm.

2. In a structure of the character set forth, the combination with a trolley pole having a downwardly turned upper end provided with a yoke, of an arm disposed longitudinally and in rear of said pole, said arm having a pivotal connection between its ends in said yoke, a trolley wheel journaled on the outer end of the arm, the inner end of said arm having an opening, a downwardly extending guide stem fixed to the pole and passing through the opening, a stop carried by the rear end of the guide stem, and a compression spring located on the stem and interposed between the arm and pole.

3. In a structure of the character set forth, the combination with a pole, of an arm having a swinging movement in line with the pole and having a swinging movement laterally thereof, a plurality of pivotal connections between the pole and arm that permits such movement, one of said pivotal connections constituting a guide on which the arm slides when the arm swings on the other connection as an axis, and a trolley wheel journaled on the arm.

4. In a structure of the character set forth, the combination with a pole, of an arm having a pivotal connection between its ends with the pole, said arm having a lateral sliding movement on the pivot, a guide stem for the inner end of the arm on which said arm swings during its lateral movement, a spring interposed between the arm and pole, and a trolley wheel journaled on said arm.

5. In a structure of the character set forth, the combination with a trolley pole having a rearwardly turned upper end provided with a yoke, a pin located in the yoke, an arm pivotally mounted on the pin and having a limited lateral sliding movement thereon, a trolley wheel carried by the outer end of the arm, the inner end of said arm having an opening, a stem carried by the pole and passing through the opening, the inner end of said arm sliding on the stem when the arm swings on the pin of the yoke and swinging with said pin as an axis during the lateral movement of the arm, and a compression spring located on the stem and interposed between the arm and pole.

In testimony, that I claim the foregoing as my own, I have hereto affixed my signature in the presence of two witnesses.

SAMUEL B. SICKELSMITH.

Witnesses:
JOHN H. SIGGERS,
S. GEORGE TATE.